United States Patent Office 3,529,471
Patented Sept. 22, 1970

3,529,471
PNEUMATICALLY CONTROLLED LOAD CELLS
Leslie Ernest Lightowler and Brian Colin Pagdin, Sheffield, England, assignors to Laycock Engineering Limited, Sheffield, England, a British company
Filed Dec. 5, 1967, Ser. No. 688,164
Claims priority, application Great Britain, Dec. 12, 1966, 55,506/66
Int. Cl. G01l 1/02
U.S. Cl. 73—141                    6 Claims

ABSTRACT OF THE DISCLOSURE

A pneumatically controlled load cell substantially independent of temperature and main air pressure variations and capable of responding quickly to variations in magnitude of the applied load is constituted by a cylinder accommodating a piston the head of which is arranged to receive the applied load, the cylinder having an air inlet passage incorporating a ball valve operable by movement of the piston under load and an air outlet passage connected to a device for indicating the pressure developed in the cylinder under the applied load.

---

This invention relates to pneumatically controlled load cells of the kind intended for the measurement of loads applied to the cell, an object of the invention being to provide such a cell that is substantially independent of temperature and main air pressure variations, and one that will respond quickly to variation in magnitude of the applied load.

According to the present invention, there is provided a pneumatically controlled load cell of the kind referred to, comprising a housing bored to form a cylinder, an air inlet passage from the cylinder to a main air inlet formed in the housing, a non-return valve provided in the inlet passage and arranged, upon opening, to admit air from the main air inlet to the cylinder, an air outlet passage from the cylinder to an air outlet formed in the housing, a piston slidably mounted in the cylinder with its head arranged to receive the applied load, a valve-actuating rod secured to the piston and arranged, upon movement of the piston inwardly of the cylinder under applied load, to open the valve, and means connected to the air outlet for indicating the pressure developed in the cylinder under the applied load.

The valve actuating member is conveniently in the form of a tappet rod making screw engagement with a threaded bore in a hub extending inwardly of the piston (conveniently formed hollow for compactness), the bore being co-axial with the cylinder. The valve conveniently consists of a ball spring-urged towards the piston into engagement with a seating formed in a chamber enlarged from the air inlet passage, the chamber being co-axial with the threaded bore.

The piston is preferably formed with one or a series of circumferential grooves serving to collect any extraneous matter that may find its way into the working clearance between the piston and the cylinder wall.

The diameter of the piston is so chosen as to resist the maximum desired load under a given main air pressure and, to avoid excess air wastage, the working clearance is kept to the smallest practical minimum, e.g., an annular gap of 0.001 of an inch wide.

The invention has been found particularly useful as applied to apparatus now known as "Chassis Dynamometers," such apparatus being used, for example, for checking various power characteristics of a motor vehicle engine.

By way of example, the invention will now be described in greater detail with reference to the accompanying diagrammatic drawings, as applied to a chassis dynamometer.

Figure 1:
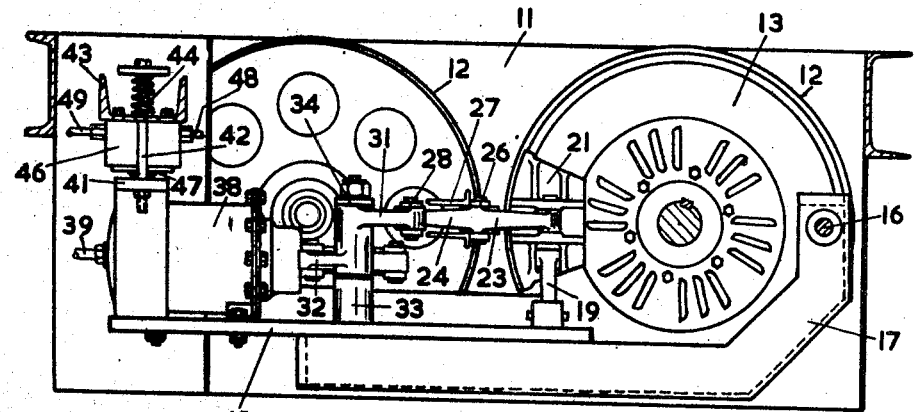
Figure 2:
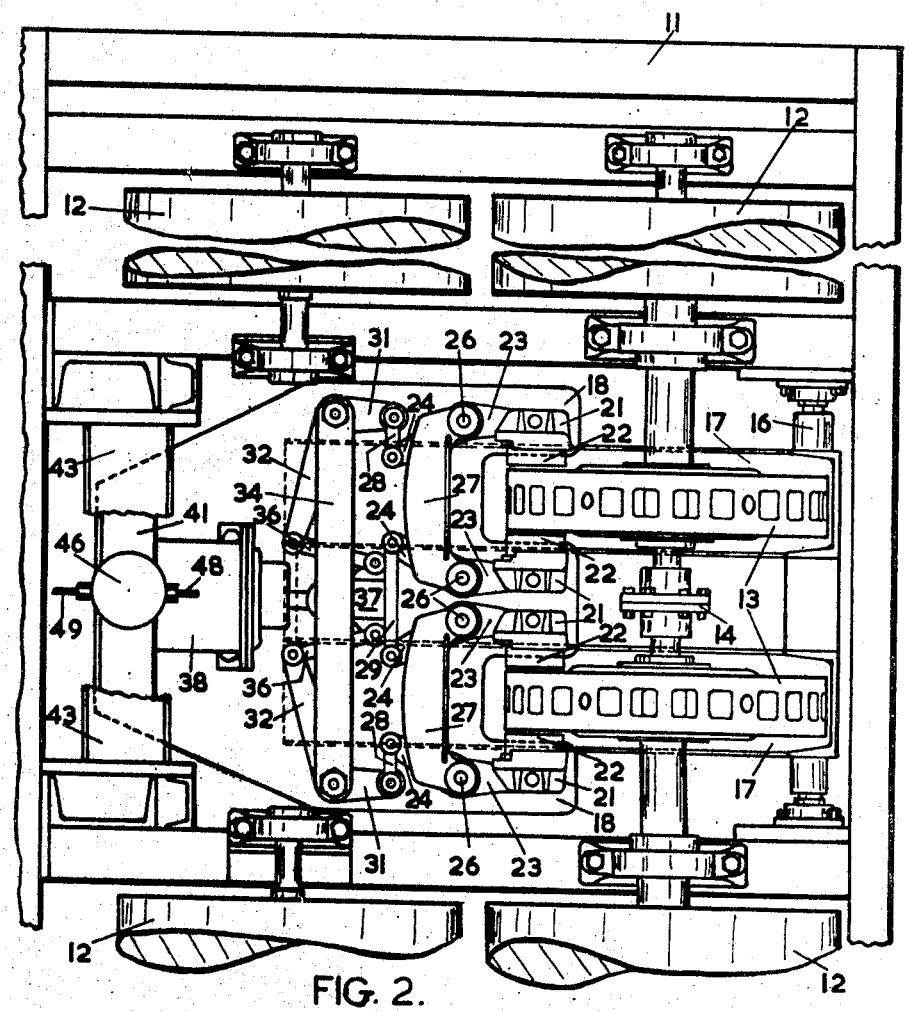
Figure 3:
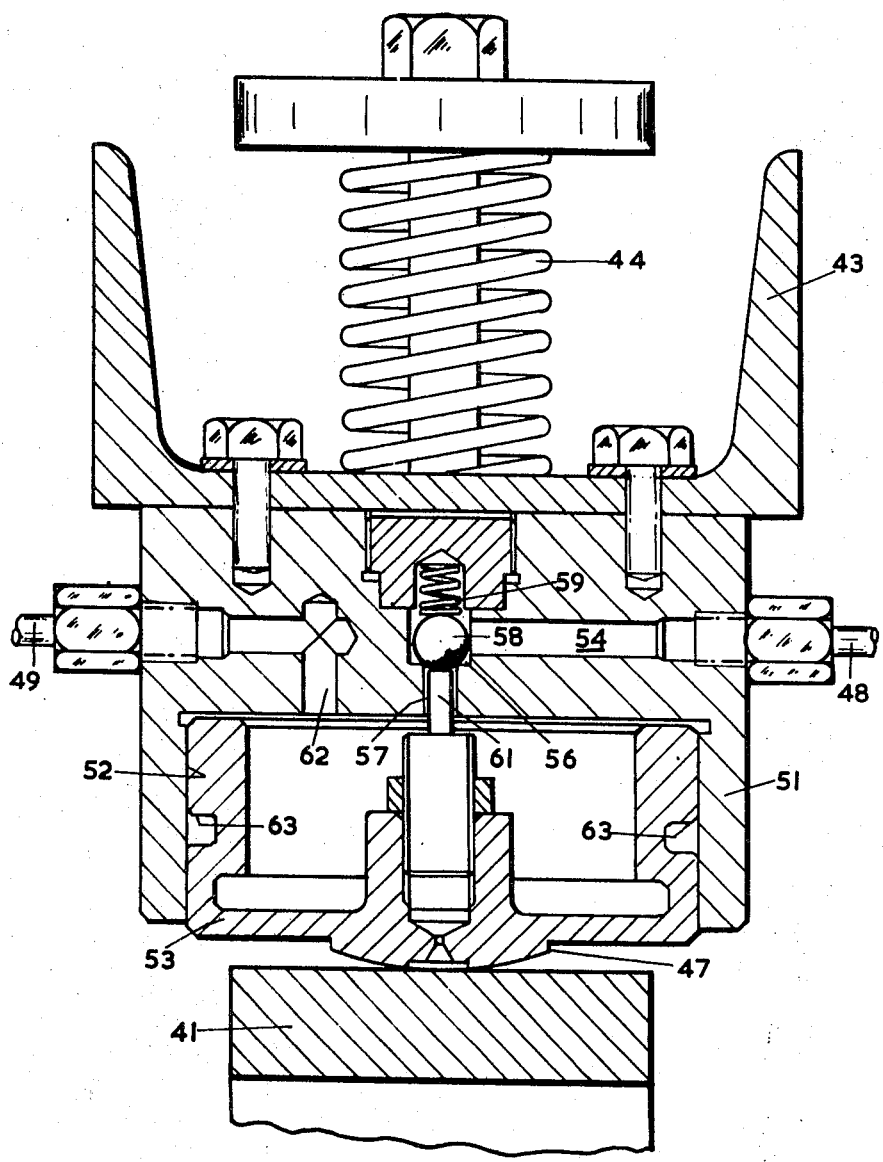

In the drawings:
FIG. 1 is an elevation, partly in section, showing the essential parts of the dynamometer,
FIG. 2 is a plan of the apparatus shown in FIG. 1, partly broken away, and
FIG. 3 is a sectional view of the load cell shown in FIGS. 1 and 2.

Arranged in a main supporting framework 11 is a series of pivoted rolls 12 arranged in two pairs spaced axially, to suit the track of a motor vehicle, the rollers of each pair being spaced laterally and arranged to support a wheel of the vehicle. For simplicity, the apparatus described in this example will be treated as intended primarily for checking various power characteristics of a motor vehicle engine, in which case, the rolls 12 are freely rotatably and intended to be driven by the driven wheels of the vehicle intended to be tested. It will be understood, however, that when the apparatus is intended also for other purposes, e.g., testing the brakes of a vehicle or checking the acceleration characteristics, one roll of each pair of rolls 12 may be driven by an independent power source. Similarly, each pair of rolls 12 may be directly coupled for synchronous operation.

Arranged axially between the rolls 12 of one pair is a pair of axially spaced brake discs 13 secured to the shafts of the rolls 12 and directly connected by a coupling 14.

Mounted for movement about a supporting pivot 16 mounted in the framework 11 and spaced radially from and parallel to the axis of the discs 13 is a torque arm 17 carrying a platform 18 extending centrally of the pairs of rolls 12. Supported by links 19 from the platform 18 are pairs of disc brake blocks 21 faced with brake pads 22, the blocks 21 of each pair being pivotally attached, respectively, to arms 23 of two-armed levers 23, 24 themselves pivoted, respectively, about axes 26 in yokes 27. The other arms 24 of the two-armed levers 23, 24 in the case of each pair of blocks 21 are pivotally connected one to a separate link 28 and the other to a common link 29, the latter connecting the arms 23, 24 of the inner blocks 21 while the links 28, respectively, connect the arms 24 of the outer blocks 21 to arms 31 of two-armed levers 31, 32 pivotally mounted on pillars 33 secured to the platform 18 the pillars being connected at their upper ends by a bridge piece 34. The arms 32 of the levers 31, 32 are pivotally attached by links 36 to a cross-head 37 secured to the piston of an air cylinder 38 connected by a conduit 39 to a source of supply of air under under pressure, the cylinder 38 also being secured to the platform 18.

The end of the platform 18 opposite the supporting pivot 16 is provided with a bridge piece 41 by means of which that end of the platform 18 is suspended through the medium of rods 42 extending through a cross member 43 secured to the framework 11, the rods being urged upwardly by springs 44. The cross member 43 also supports a load cell 46 of the kind referred to above, and the bridge piece 41 is adjusted by the springs 44 so that the weight of platform 18 is counter-balanced by the springs 44 with the bridge piece 41 just contacting the head 47 of the operating piston of the load cell 46. Under these conditions, it will be seen that any forces transmitted by the torque arm 17 to the load cell 46 are transmitted with virtually no lost motion or "backlash."

Referring particularly to FIG. 3, the load cell 46 is formed as a housing 51 secured to the cross member 43 by screws, the housing 51 being bored to form a cylinder 52 in which is slidably mounted a piston 53. An air inlet passage 54 is formed in the housing 51 and leads from a valve chamber 56 to the main air inlet 48, the valve chamber 56 opening into a passage 57 leading into the cylinder 52. A non-return ball valve 58 is seated in the chamber 56 and is urged by a spring 59 towards its closed position. A valve-actuating rod 61 is adjustably mounted in the piston 53 and extends into the passage 57 for the purpose of engaging the valve 58 upon inward movement of the piston 53. An outlet passage 62 formed in the housing 51 leads to the outlet conduit 49 which leads to a load gauge on a control panel (not shown). The piston 53 is formed with a circumferential groove 63 serving to collect extraneous matter that may find its way into the working clearance between the piston 53 and the wall of the cylinder 52.

In order to ensure that air may pass through the inlet valve 58 into the cylinder 52 when the piston 53 reaches the end of its inward travel, i.e., when the piston 53 engages the end wall of the cylinder 52, the valve-actuating rod 61 is so adjusted that, in the above circumstances, the valve remains slightly open, e.g., providing an opening of, say, 0.010 of an inch to 0.040 of an inch.

In operation with the rolls 12 being driven by the driving wheels of the vehicle to be tested, pressure air is supplied to the cylinder 38 through the conduit 39 to apply a braking force to the blocks 21 by the cross-head 37 and associated linkage, thus causing a reactionary force to be set up in the torque arm 17 by the brake discs 13 which causes the arm 17 to tend to rotate in the same direction as the rolls 12. Such reactionary force is transmitted to the head 47 of the piston of the load cell 46. Air under the given pressure is admitted to the cylinder 52 through the valve 58 and acts on the effective area of the piston 53 causing a reactionary force under the applied load, the reactionary force being greater than and opposite to that produced by the applied load. The greater reactionary force thus causes the piston 53 to move outwardly and thus allow the valve 58 to move under the spring pressure towards closed position. There is permitted, however, an escape of air from the cylinder 52 through the small annular gap between the piston and the cylinder, and it will be seen that a state of equilibrium will be reached when the rate of air flow through the valve 58 is equal to the rate of flow through the annular gap. When such state of equilibrium is reached, the air pressure in the cylinder 52 will balance the applied load and will thus be a function of the magnitude of the applied load. By connecting the air outlet conduit 49 to the load gauge mentioned above, therefore, the magnitude of the applied load may be directly read off.

In the above construction, it will be seen that, since air is continuously leaking through the annular gap, the piston 53 is virtually floating on a cushion of air so that sliding friction between the piston 53 and cylinder 52 is reduced to a minimum. Moreover, because of the continuous flow of air through the piston and the cylinder, any variations in the temperature of the ambient air has little or not effect on the operation of the device.

The device has been found to respond very quickly to changes in magnitude of the applied load, so much so that the travel of the piston even under maximum load need only by very small, e.g., of the order of 0.003 of an inch.

What we claim is:
1. A pneumatically controlled load cell of the kind referred to, comprising a housing bored to form a cylinder, an air inlet passage from the cylinder to a main air inlet formed in the housing, an inlet valve provided in the inlet passage and urged towards its closed position, said valve being arranged, upon opening movement, to admit air from the main air inlet to the cylinder, an air outlet passage from the cylinder to an air outlet formed in the housing, and leading to means for indicating the pressure developed in the cylinder under the applied load, a piston slidably mounted in the cylinder with a predetermined annular clearance between the piston and the cylinder to permit a continuous leakage of air through said clearance, the head of the piston being arranged to receive an applied load, and a valve-actuating member secured to the piston and arranged, upon movement of the piston inwardly of the cylinder under an applied load, to open the valve against said urging pressure.

2. Apparatus as in claim 1, wherein the valve-actuating member is in the form of a tappet rod making screw engagement with a threaded bore in a hub extending inwardly of the piston.

3. Apparatus as in claim 2, wherein the valve consists of a ball spring-urged towards the piston into engagement with a seating formed in a chamber enlarged from the air inlet passage, the chamber being co-axial with the threaded bore.

4. Apparatus as in claim 1, wherein the piston is formed with one or a series of circumferential grooves serving to collect any extraneous matter that may find its way into the working clearance between the piston and the cylinder wall.

5. Apparatus as in claim 1, wherein the diameter of the piston is so chosen as to resist the maximum desired load under a given main air pressure and the working clearance is kept to a minimum.

6. Apparatus as in claim 1, wherein the valve-actuating member is so adjusted that, when the piston reaches the end of its travel inwardly of the cylinder, the valve remains slightly open.

References Cited

UNITED STATES PATENTS

| 411,510 | 9/1889 | Riley | 73—419 |
|---|---|---|---|
| 1,771,340 | 7/1930 | Martin | 73—144 |
| 3,339,650 | 9/1967 | Carr | 177—208 XR |
| 751,296 | 2/1904 | Jones | 177—208 |
| 1,580,430 | 4/1926 | Gaines | 73—141 |
| 2,956,761 | 10/1960 | Weber | 177—208 XR |
| 3,176,510 | 4/1965 | Kimmell et al. | 73—144 |

FOREIGN PATENTS 275,985  7/1914  Germany.

CHARLES A. RUEHL, Primary Examiner

U.S. Cl. X.R.

73—117; 177—208